United States Patent [19]

Wiener

[11] Patent Number: 5,100,312
[45] Date of Patent: Mar. 31, 1992

[54] CALENDER ASSEMBLY

[75] Inventor: Stefan Wiener, Hanover, Fed. Rep. of Germany

[73] Assignee: Hermann Berstorff Maschinenbau GmbH, Hanover, Fed. Rep. of Germany

[21] Appl. No.: 650,243

[22] Filed: Feb. 4, 1991

[30] Foreign Application Priority Data

Feb. 13, 1990 [DE] Fed. Rep. of Germany ....... 4004286

[51] Int. Cl.⁵ .................. B21B 31/08; B29C 43/24; B30B 3/04
[52] U.S. Cl. .................................. 425/186; 29/110; 29/700; 72/239; 100/176; 425/194; 425/363; 425/DIG. 235
[58] Field of Search .......... 29/110, 700, 724; 72/237-239; 100/168, 176, 155 R; 264/175; 425/186, 194, 363, 367, DIG. 235

[56] References Cited

U.S. PATENT DOCUMENTS

| 2,277,313 | 3/1942 | Fowler | 425/194 |
| 4,649,631 | 3/1987 | Orth | 29/700 |
| 4,699,050 | 10/1987 | Heise | 425/367 |
| 4,729,153 | 3/1988 | Pav et al. | 29/116.2 |
| 4,823,450 | 4/1989 | Ramisch et al. | 29/130 |

FOREIGN PATENT DOCUMENTS

| 58-8618 | 1/1983 | Japan | 425/194 |
| 61-127318 | 6/1986 | Japan | 425/194 |

Primary Examiner—Jay H. Woo
Assistant Examiner—James P. Mackey
Attorney, Agent, or Firm—Foley & Lardner

[57] ABSTRACT

A calender assembly having at least two calender rollers mounted on axles and which jointly define a calendering nip with at least one of the rollers being mounted for rotation in a support column. Each roller includes a roller axle and a roller core and at least one of the rollers is provided with a removable shell. The axle of the roller provided with the shell is provided with a bearing member acted upon by a plurality of bearing body portions. Adjustment devices are provided for displacing the bearing body portions towards and away from the bearing member. Such movement of the body portions away from the bearing member defines an aperture through which the shell on the roller can be removed and a replacement shell inserted.

8 Claims, 4 Drawing Sheets

CALENDER ASSEMBLY

FIELD OF THE INVENTION

The present invention relates to a calender assembly. More particularly, the present invention relates to a calender assembly incorporating a bearing arrangement, which permits a roller shell to be removed and replaced in a relatively simple manner.

BACKGROUND OF THE INVENTION AND PRIOR ART DISCUSSION

Calenders having two or more rollers disposed in a support column are known and are used for producing profile strips from elastomeric materials and for producing embossed films of thermoplastic materials. It is also known to provide at least one of such rollers with a roller shell which can be changed as desired.

Such a calender is disclosed in German Patent Specification No. 35 06 423. Such calender includes means permitting the change-over of the roller shell so that embossed films formed from thermoplastic plastics materials or profile strips formed from elastomeric materials can be produced. Such prior art calender comprises at least two rollers disposed in a support column and at least one of the rollers has a removable, profiled shell disposed around a roller core.

The roller shell serves to emboss individual profiles into the calendered products. In consequence, however, the roller shell needs to be changed every time it is desired to alter the goemetry of the profile. The operators of such calendering assemblies are therefore compelled to change the roller shell at relatively frequent intervals, particularly when small batches of products are being produced. This occurs, for example, when the assembly is being used for producing tires for specialist vehicles. It is, of course, desirable to keep the time taken for a change-over process to be effected as short as possible.

In an attempt to achieve this, it has been proposed, in the known assembly, to withdraw the bearing body of the roller having the shell to be changed from the calender support column and then to change-over the roller shell by withdrawing it through the calender support column, utilizing the free space produced by the removal of the bearing body.

For this purpose, the roller axle is made to protrude laterally beyond the calender support column. The protruding end of the axle is initially acted upon by means of a hydraulically actuated hold-down member so that the other end of the roller cannot drop once the bearing body has been removed. A centering cylinder is subsequently introduced into the end face of the roller core remote from the hold-down member and, by means of hydraulic piston and cylinder arrangements, the bearing body is drawn out of the calender support column over the end of the roller axle remote from the hold-down member. The hydraulically actuatable centering cylinder and the hydraulic piston and cylinder arrangements for the removal of the bearing body are mounted on a frame, which is horizontally pivotable about a pivot provided on the calender support column. A locking means is provided which is released after the bearing body and centering cylinder have been removed. The pivotable frame and the bearing body, are then pivoted away from the calender frame. The new roller shell is subsequently inserted through the aperture thus formed in the calender support column and the hinged frame is pivoted back into its original position and locked therein. After the centering cylinder has been introduced into the roller core, the bearing body is relocated on the roller pin and into the calender support column. The hold-down member for the other end of the axle roller is then raised.

However, while this arrangement for changing the roller shell has numerous advantages, it is also disadvantageous in that the removed bearing body cools during the change-over process and such cooling causes shrinkage. If the change-over operation takes a long time, there is the possibility that, when attempts are made to re-position the bearing body on the roller axle, the bearing body cannot be returned into its proper position, or can only be returned using additional, mechanical aids. This is a serious disadvantage because the operator of the system needs to effect the change-over as rapidly and as simply as possible.

OBJECTS OF THE INVENTION

The present invention seeks to provide a calender assembly which permits the roller shell to be changed more rapidly than has been possible hitherto. The present invention further seeks to provide a calender assembly which, even if the change-over operation takes a relatively long time, is simple to operate so that the calender assembly has a very simple and economical construction.

SUMMARY OF THE INVENTION

According to the present invention, there is provided a calender assembly for producing profiled strips of elastomeric materials and embossed films of thermoplastic plastics materials, the assembly comprising a support column; at least two roller means defining a calendering nip therebetween with at least one of said roller means mounted for rotation in said support column, each said roller means comprising a roller axle and a roller core mounted on said axle; at least one of said roller means additionally including a roller shell surrounding said roller core wherein said shell is removable from said roller core; means for removing said shell from said core; said roller axle of said at least one roller means including opposed first and second end regions and said first end region projecting beyond said roller core and externally of said support column, hold-down means disposed externally of said calender frame and displaceable to bear against said first end region of said roller axle; bearing means for mounting said second end region of said roller axle, said bearing means comprising a bearing member surrounding said second end region of said roller axle and a plurality of bearing body portions jointly defining a bearing surface for said bearing member, and means for displacing said bearing body portions towards and away from said bearing member whereby displacement of said bearing body portions away from said bearing member defines an aperture through which said roller shell is removable in a direction parallel to the axis said roller axle and through which a replacement roller shell is insertable.

The provision of a plurality of bearing body portions, either in or on the calender support column, and which form a bearing surface for a bearing member mounted on the roller axle is a simple arrangement. Accordingly, considerably fewer component parts are required than has hitherto been the case. The displacement of these body portions towards and away from the bearing member means that the roller shell of a calender roller can be replaced both rapidly and reliably.

As has been possible hitherto, once the bearing body portion has been displaced away from the roller axle it is possible for the roller shell to be removed from the roller core, utilizing a hydraulic piston-and-cylinder arrangement. The shell can then be removed from the calender, in the direction of the axis of the roller, through the calender support column. After the roller shell has been removed and before a new roller shell has been placed in position by reversing the above-described procedure, it is advantageously possible for the bearing body portions to be repositioned on the bearing member. This means that there is no risk of cooling of the body portions and hence no risk of shrinkage of such portions which is associated with such cooling. In order to locate the new roller shell in position, the bearing body portions are once more moved away from the bearing member to allow the insertion of the new shell. Immediately thereafter, the bearing body portions are repositioned on the bearing member so that the calender is ready for operation.

Moreover, the bearing body portions are displaceable towards and away from the bearing member by adjusting means. Such displacement is effected in such a manner that a firm, clearance-free bearing seat is ensured, especially during normal operation of the calendering system.

Because the number of component parts required for changing-over the roller shell is considerably reduced compared with prior art arrangements, more economical production is achieved, and the system operates reliably with little maintenance. In addition, the arrangement of the invention permits the time required to carry out the entire change-over operation to be reduced to substantially one-half of that required in the prior art arrangements.

BRIEF DESCRIPTION OF THE DRAWINGS

The invention will be further described, by way of example, with reference to the accompanying drawings, in which.

DESCRIPTION OF PREFERRED EMBODIMENTS

Figure 1:
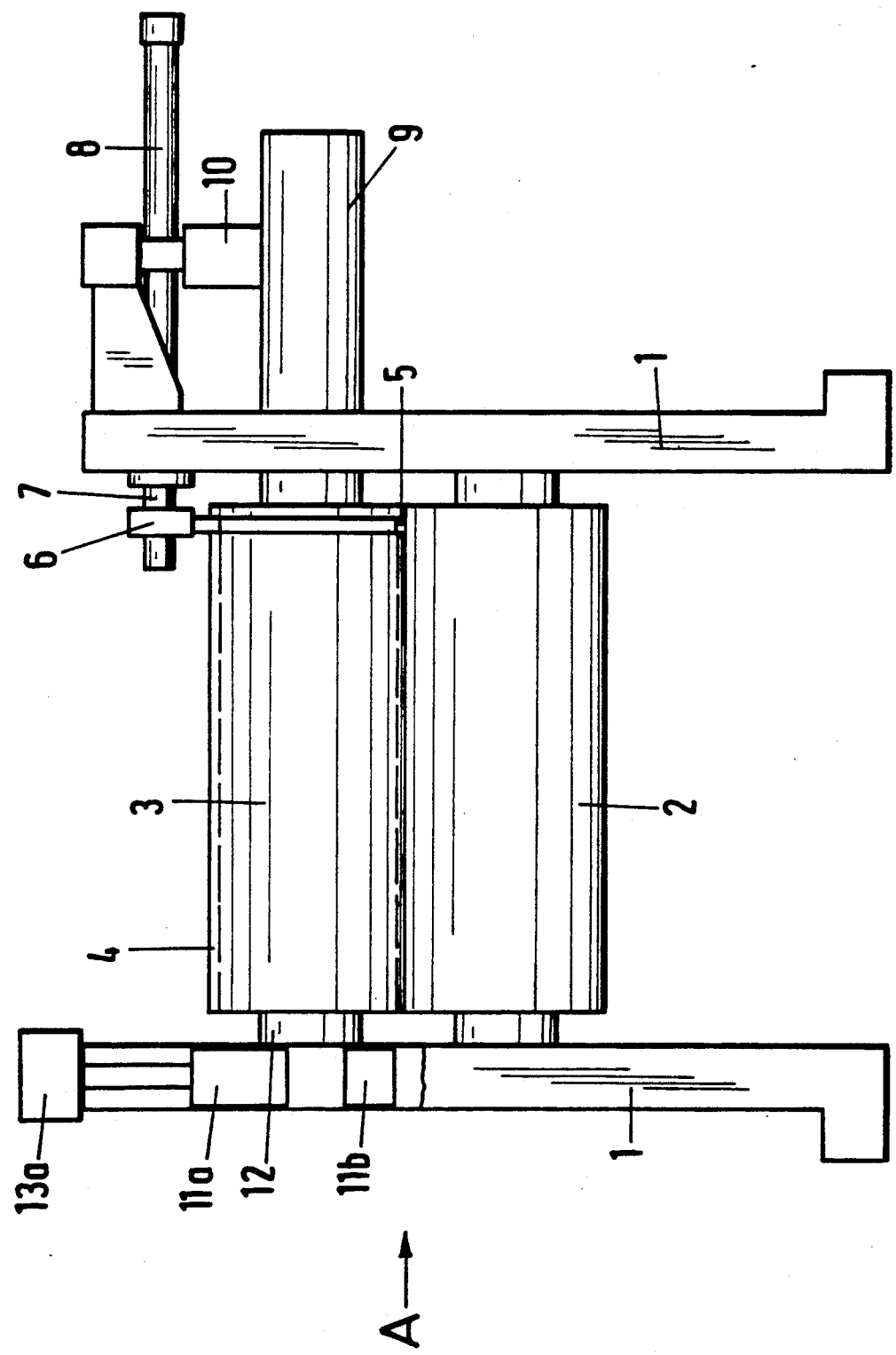
FIG. 1 is a longitudinal sectional view through a first embodiment of a profile calender assembly, including a hold-down member and a three-part bearing body assembly mounted in a calender support column.

In the drawings, there is schematically shown a calender assembly which comprises a calender support column 1. Disposed in the column 1 are calender rollers 2 and 3. In the embodiments shown, upper roller 3 is provided with an interchangeable, profiled external shell 4.

Adjacent one of its ends, the roller shell 4 is provided with a circumferential groove 5 in which a stripper plate 6 engages. The stripper plate 6 is mounted on shafts 7 and is guided through the support column. The plate is movable parallel to the axis of the roller 3 by means of a hydraulic piston and cylinder arrangement 8.

A hold-down member 10 is mounted on an upright portion of the calender support column 1. This member 10 is positionable on one end 9 of an axle for the roller 3, which axle extends through the upright of the support column 1. The end 9 of the axle protrudes from the end of the roller shell 4 carrying the groove 5. The member 10, in use, is displaced to apply a downwardly directed force to the end 9 of the axle.

Figure 2:
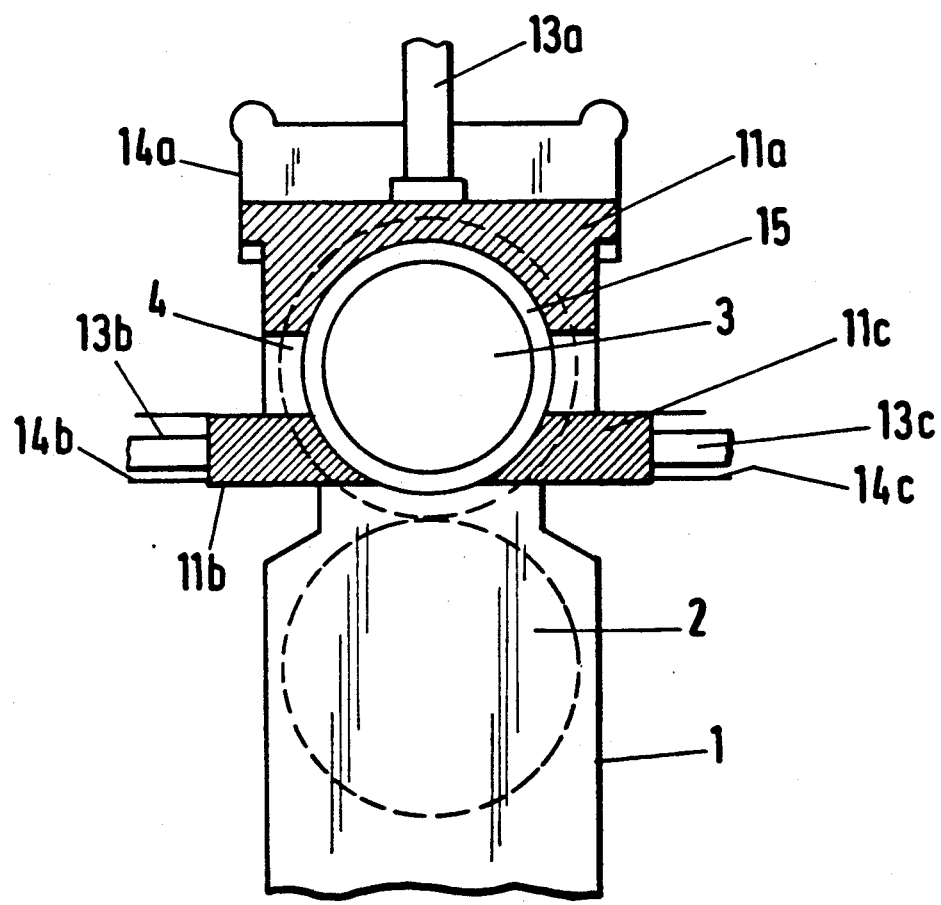
FIG. 2 is a partial front elevational view of the assembly shown in FIG. 1 as seen in the direction of arrow A in that FIG. with the bearing body assembly being shown in its operational position.

FIG. 2 is a front view of the calender support column 1 as would be seen by viewing in the direction of arrow A in FIG. 1. The end 12 of the axle for upper roller 3 provided with the profiled roller shell 4 to be changed is mounted and supported in the support column 1 by means of a bearing 15 and a bearing body assembly. The bearing body assembly comprises, in this embodiment, three bearing body portions 11a, 11b, 11c. Adjustment means 13a, 13b, 13c for the portions 11a, 11b and 11c respectively are provided to permit displacement of the portions 11a, 11b and 11c in guide means 14a, 14b and 14c respectively, which latter are formed in the calender support column 1. The bearing surfaces of the bearing body portions 11a, 11b, 11c do not completely surround the roller bearing 15, although they could, if desired, do so. In the position shown in FIG. 2, the bearing body portions 11a, 11b and 11c press upon the bearing 15 in such a manner that a reliable, clearance-free, mounting of the roller 3 is ensured.

Figure 3:
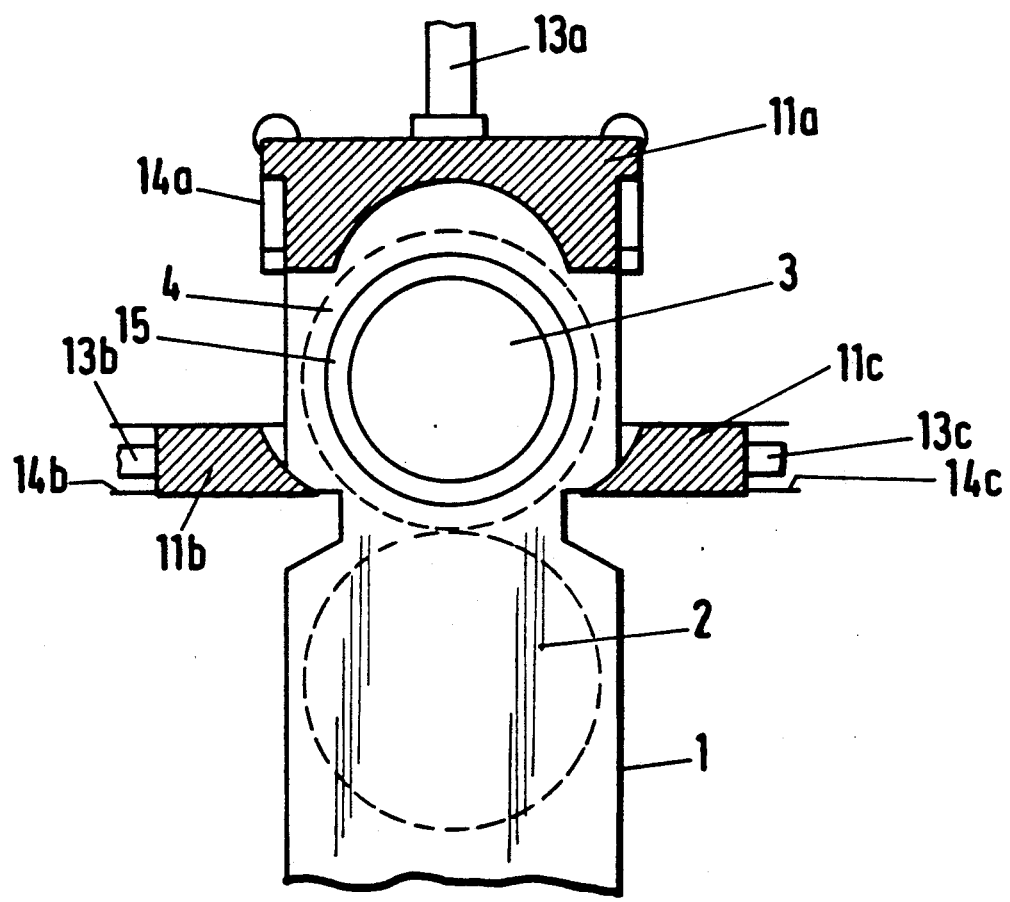
FIG. 3 is a view similar to FIG. 2 but showing the bearing body assembly displaced so as to permit the change-over of a calender roller shell.

In order to permit the change-over the roller shell 4, the bearing body portion 11a is displaceable vertically upwardly in its guide means 14a and the bearing body portions 11b and 11c are each displaceable horizontally, away from one another in their respective guide means 14b and 14c. The positions adopted by the bearing body portions 11a, 11b and 11c after such displacement is shown in FIG. 3.

Figure 4:
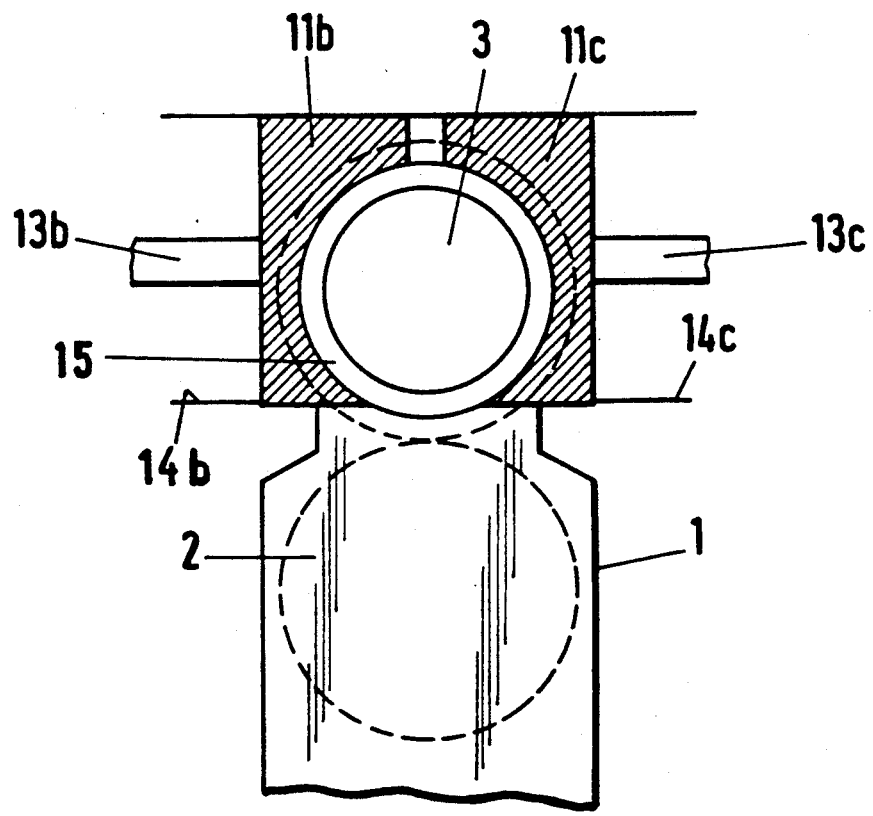
FIG. 4 is a view similar to FIG. 2 but of a second embodiment of a profile calender assembly which includes a two-part bearing body.

In a further embodiment of the invention, the bearing body portions are not mounted in the calender frame, but are disposed laterally thereon. Moreover, it is possible to support the end 12 of the roller axle 12 by means of bearing body portions 11b and 11c. In such a case, as shown in FIG. 4 the two bearing body portions are disposed one on each side of the medial vertical plane through the axle end and are displaceable horizontally, in opposite directions to one another in guide means 14b and 14c by adjustment means 13b and 13c respectively.

The manner in which the roller shell 4 is changed will now be described. It should, however, be mentioned that the replacement roller shell is preheated in a heating means (not shown) until it reaches substantially the operating temperature of the calender.

Initially, the roller shell 4 is displaced into a change-over position by means of an adjusting device (not shown). The hold-down member 10 is then displaced downwardly by means of a hydraulic piston and cylinder arrangement whereby it applies a downwardly acting force to the end 9 of the roller axle.

By actuating the adjustment means 13a, 13b, 13c, the bearing body portions 11a, 11b, 11c are displaced on their guide means 14a, 14b, 14c. They are thus moved away from the bearing 15 on the end 12 of the roller axle, so that a free space is produced in the column 1 through which the roller shell 4 can be removed. The bearing body portions 11a, 11b and 11c are lockable in their displaced position. Due to the action of the hold-down member 10 on the end 9 of the roller axle, the other end 12 of the axle is prevented from dropping when the free space is created.

A means (not shown) for locking the roller shell 4 to the core of the roller 3 is then released. The roller shell 4 is then removed from the roller core by means of the stripper plate 6. As the hydraulic piston and cylinder arrangement 8 is actuated, the plate 6 displaces the shell 4 horizontally, to the left as shown in FIG. 1.

Once a hoist (not shown) has removed the previously used roller shell, the bearing body portions 11a, 11b and 11c can be repositioned on the roller bearing 15. This may take a relatively long time to complete. Due to the temperature of the calender, the replacement of bearing body portions prevents them from shrinking.

Subsequently, the bearing body portions are retracted again and the new pre-heated profiled roller shell is slipped over the roller core and is locked in position. The bearing body portions are then moved towards the bearing 15 on the roller axle 12 and are locked in position.

I claim:

1. A calender assembly for producing profiled strips of elastomeric materials and embossed films of thermoplastic plastics materials, the assembly comprising a support column; at least two rollers defining a calendering nip therebetween, with at least one of said rollers mounted for rotation in said support column, each said roller comprising a roller axle and a roller core mounted on said axle, said at least one of said rollers additionally including a roller shell surrounding said roller core and removable therefrom; means for removing said shell from said core; said roller axle of said at least one of said rollers including opposed first and second end regions, said first end region projecting beyond said roller core and externally of said support column; a hold-down member disposed externally of said support column and displaceable to bear against said first end region of said roller axle; bearing means for mounting said second end region of said roller axle comprising a bearing member surrounding said second end region of said roller axle and a plurality of bearing body portions jointly defining a bearing surface for said bearing member; and means for displacing said bearing body portions towards and away from said bearing member, wherein said plurality of bearing body portions comprises first, second and third bearing body portions, and said means for displacing said body bearing portions comprises first, second and third adjustment devices associated respectively with said first, second and third bearing body portions, and wherein aid first adjustment device displaces said first bearing body portion substantially vertically with respect to said bearing member, and said second and third adjustment devices respectively displace said second and third bearing body portions substantially horizontally with respect to said bearing member but in opposed directions to one another, whereby displacement of said bearing body portions away from said bearing member defines an aperture through which said roller shell is removable in a direction parallel to the axis of said roller axle and through which a replacement roller shell is insertable.

2. A calender assembly as recited in claim 1, further comprising separate guide means for guiding each said bearing body portion during displacement by said displacing means associated therewith.

3. A calender assembly as recited in claim 1, wherein each said bearing body portion is displaceable between first and second end positions, said assembly further including means for locking said bearing body portions in said first and second end positions.

4. A calender assembly as recited in claim 1, wherein said support column mounts said bearing means.

5. A calender assembly for producing profiled strips of elastomeric materials and embossed films of thermoplastic plastics materials, the assembly comprising a support column; at least two rollers defining a calendering nip therebetween, with at least one of said rollers mounted for rotation in said support column, each said roller comprising a roller axle and a roller core mounted on said axle, said at least one of said rollers additionally including a roller shell surrounding said roller core and removable therefrom; means for removing said shell from said core; said roller axle of said at least one of said rollers including opposed first and second end regions, said first end region projecting beyond said roller core and externally of said support column; a hold-down member disposed externally of said support column and displaceable to bear against said first end region of sad roller axle; bearing means for mounting said second end region of said roller axle comprising a bearing member surrounding said second end region of said roller axle and a plurality of bearing body portions jointly defining a bearing surface for said bearing member; and means for displacing said bearing body portions towards and away from said bearing member, wherein said plurality of bearing body portions comprises first and second body portions, and said means for displacing said bearing body portions comprises first and second adjustment devices associated respectively with said first and second body portions, wherein said first and second body portions are disposed one on each side of a vertical plane containing the longitudinal axis of said roller axle, and wherein said adjustment devices displace said first and second body portions in substantially opposed directions, whereby displacement of said bearing body portions away from said bearing member defines an aperture through which said roller shell is removable in a direction parallel to the axis of said roller axle and through which a replacement roller shell is insertable.

6. A calender assembly as recited in claim 5, further comprising separate guide means for guiding each said bearing body portion during displacement by said displacing means associated therewith.

7. A calender assembly as recited in claim 5, wherein each said bearing body portion is displaceable between first and second end positions, said assembly further including means for locking said bearing body portions in said first and second end positions.

8. A calender assembly as recited in claim 5, wherein said support column mounts said bearing means.

* * * * *